July 4, 1950  H. G. DE FRANCE  2,513,849
APPARATUS FOR DETERMINING A DIRECTION
Filed June 17, 1946

INVENTOR
HENRI GEORGES DE FRANCE
BY
Bailey, Stephens & Huettig
ATTORNEYS

Patented July 4, 1950

2,513,849

UNITED STATES PATENT OFFICE 2,513,849

APPARATUS FOR DETERMINING A DIRECTION

Henri Georges de France, Saint Cloud, France

Application June 17, 1946, Serial No. 677,392
In France June 20, 1945

5 Claims. (Cl. 343—117)

The present invention relates to apparatus for determining a direction, in particular the direction of a target or an object which transmits or reflects suitable signals, for instance electromagnetic, acoustic, electroacoustic (in particular supersonic) or such signals.

The chief object of my invention is to provide an apparatus of this kind which is better adapted to meet the requirements of practice than those used for the same purpose up to the present time.

Preferred embodiments of my invention will be hereinafter described with reference to the accompanying drawings, given merely by way of example and in which.

Figure 1:
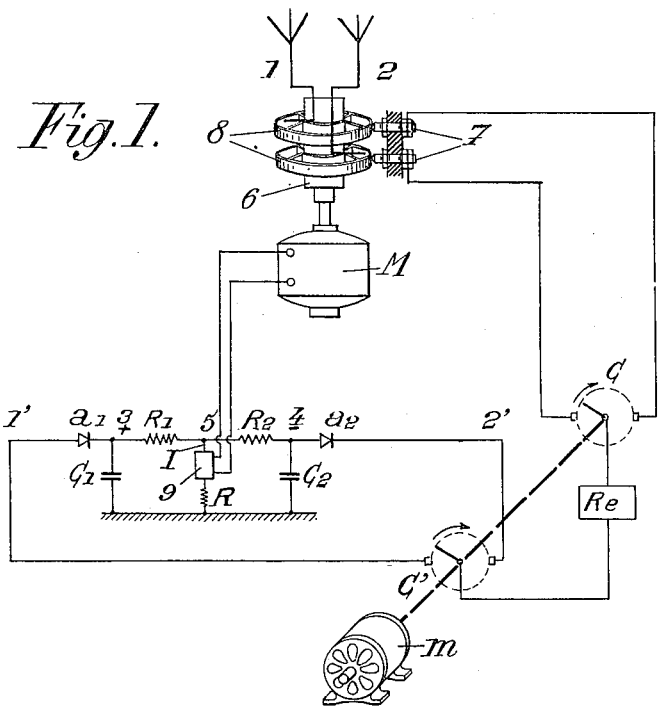
Fig. 1 is a diagrammatical view of an apparatus for determining the direction of a target, this apparatus being made according to the invention.

My invention is applicable to apparatus for determining the direction of a target (for instance for fire preparation for guns, turrets, etc.), both concerning the azimuth and the angle of elevation, for submarine listening, for echo detecting, for guiding airplanes, etc.

It should be reminded that apparatus have already been provided for detecting, through electromagnetic or electroacoustic means, the direction of a target. They generally include two aerial devices such as frames or antennas, acoustic receivers, etc., for taking the signals coming from this target, these devices having different directional properties, i. e. different radiating or receiving diagrams, and being combined with means for comparing the intensities of reception obtained in the two corresponding circuits, from the same signal issued from the target. By operating said devices or any equivalent control, the two intensities of reception are adjusted to equal values and the direction of the target is thus obtained.

According to my invention, the means for comparing the two intensities of reception produce a current (or voltage) variable as a function of the relative direction of the target with respect to the apparatus or movable element thereof, which current is utilized for controlling the displacements of said apparatus or movable element thereof and automatically indicating the desired direction.

For this purpose, one may proceed in various manners which may differ between them, in particular: by the nature of the devices utilized for taking the signals, and by the nature of the means utilized for comparing the two intensities of reception.

Concerning said devices, and supposing for instance, as it will be done hereinafter, that the signals to be received are of electromagnetic origin, they may be constituted by at least two antennas such as 1 and 2 (Fig. 1) having different diagrams, or by at least two frames of suitable respective directions, or again by known combinations of frame and antenna, with phase reversal of the two elements.

System 1, 2, may be carried by the movable element or finder of the apparatus, it being understood that any arrangement can be adopted, provided that it permits of obtaining two different intensities of reception variable in accordance with the relative direction of said finder, whereby the direction of the target will be obtained when the two intensities are equal (or in a given ratio to each other different from 1).

Concerning the means for comparing the two said intensities, they are for instance adapted to permit of producing two currents or voltages that tend to oppose each other, for instance to cancel each other when the two intensities are equal, in which case direct current, i. e. detected or rectified current, is preferably utilized.

Thus, supposing that devices or aerials 1, 2 are adapted to receive an electromagnetic wave which is suitably amplified (for instance by means of two amplifier receivers coacting with the two aerials respectively, or, as it will be hereinafter assumed, by means of a common receiver $R_e$), the two receptions are respectively applied to the ends of a symmetrical circuit such as that shown at $R_1$, $C_1$, $R$, $R_2$, $C_2$, with rectifiers $a_1$, $a_2$ disposed in such manner as to produce rectified voltages of opposed directions in the two portions of this circuit.

At 1', the signal amplified from 1 acts on rectifier $a_1$ which tends to produce a positive voltage at 3. At 2', the amplified signal from 2 acts on rectifier $a_2$ which is disposed in opposed direction, so that it tends to produce a negative voltage at 4. Therefore a rectified current flows from 3 toward the earth, whereas a similar current flows from the earth toward 4, so that a small resistance R common to both circuits will produce at 5 a potential difference with respect to the earth, either positive or negative according as the current coming from 1 is of higher or lower intensity than that coming from 2.

It will therefore be possible to make use of this current I for automatically operating the movable element or finder diagrammatically shown at 6 on Fig. 1.

Advantageously, I make use of a double switch such as C, C' (Fig. 1) which successively sends current from 1 toward 1' and from 2 toward 2', an arrangement which permits of utilizing only one amplifier receiver Re.

By choosing a relatively high rate of switching, and adopting suitable time constants for circuit $R_1C_1$, $R_2C_2$ (constants $R_1$, $C_1$, $R_2$, $C_2$ being taken relatively long with comparison with the switching period), I obtain in circuit R a substantially direct current, either positive or negative according to the direction of the finder and which becomes zero when the latter passes through the target, that is to say when the two intensities of reception become equal.

It has been supposed that current is fed to switch C through sliding contacts 7 and rings 8 mounted on finder 6, this arrangement being shown by way of diagrammatic illustration of the invention.

Finally, concerning the manner of utilizing current I for controlling the direction of the apparatus, it is possible to proceed in any suitable manner, through electric, electro-pneumatic, electromagnetic or other controls or relays.

On Fig. 1, I have diagrammatically illustrated the case of an electric motor M which carries the movable element 6 and is adapted to run in one direction or the other according to the direction of the orders that are transmitted thereto from a control device such as 9 through which current I flows.

Figure 2:
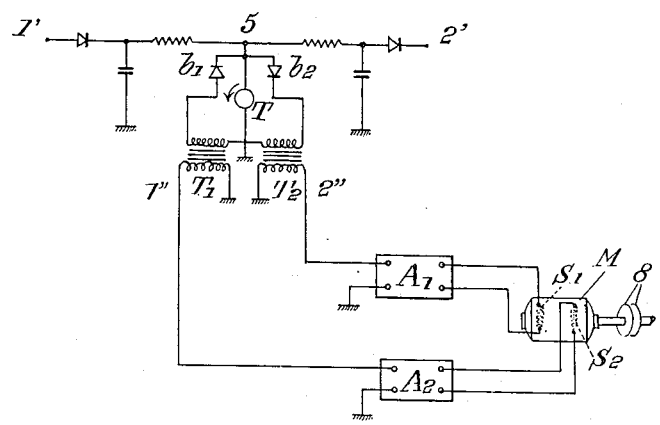
Fig. 2 shows a portion of this apparatus, according to a modification.

On Fig. 2, I have illustrated another embodiment, which is particularly advantageous (and can possibly be used separately) and according to which a voltage is produced which, when passing from one reception diagram to the other, changes the output path, according as it is to ensure the rotation or displacement in one direction or the other, the whole being in particular such that, in the path that does not correspond to the mechanical control direction to be produced the current remains zero.

Thus, as shown by Fig. 2, the resistance R of Fig. 1 is replaced by two circuits in parallel, one containing a rectifier $b_1$ which allows current to flow when the potential of 5 is positive, the other containing a rectifier $b_2$ mounted in the opposed direction, allowing current to pass only when the potential of 5 is negative.

Preferably, as shown by Fig. 2 and according to still another feature of my invention, the current flowing from 5 toward the earth is an undulatory current in order to extract therefrom an alternating component which permits easy amplification.

For this purpose, for instance, a rotary switch T (or any other equivalent static device, for instance one incorporating a thyratron) connects point 5 to the earth in a periodical manner, for instance during one half of the time. The current from 5 keeps its direction when it passes, it flows therefore exclusively either through shunt $b_1$ or through shunt $b_2$, and transformers $T_1$ and $T_2$ permit of obtaining at 1" or 2" the desired control voltage. This voltage, amplified in an amplifier $A_1$ or $A_2$, then detected, is sent for instance into one or the other of two inductor windings $S_1$, $S_2$ belonging to motor M, which will be, in particular, of the shunt wound type, these two windings creating opposed fields. Therefore, according as $A_1$ or $A_2$ is working, the motor runs in one direction or the other.

But one might also take an ordinary motor, with a relay acting as a bipolar reversing switch for reversing the direction of the inductor current according as the current comes from $A_1$ or from $A_2$.

In a general manner, any relays may be utilized for suitably utilizing the current or voltage variations in the above mentioned circuits.

The invention could be applied to the construction of apparatus making use of waves or signals other than radio-electric waves, in particular acoustic and supersonic signals.

What I claim is:

1. An apparatus for determining the direction from which electromagnetic signals are received which comprises, in combination, a rotatable aerial system the directional pattern of which includes two lobes oblique to each other, means coupled with said aerial system for separately receiving and amplifying the signals arriving to said aerial system in said two lobes thereof respectively, said means having two distinct outputs for said respective signals, a comparator device including two rectifier circuits having distinct inputs and their outputs connected in opposition to each other, means for connecting said inputs with the outputs of said receiving and amplifying means respectively, means for collecting the resultant voltage across the outputs of said rectifier circuits, motor means for rotating said aerial system and an electric control device having its input connected with the output of said resultant voltage collecting means for controlling said motor means, said comparator being adjusted so that said resultant voltage is zero when the signals are received with equal intensities in both of the lobes of said aerial system.

2. An apparatus according to claim 1 in which said aerial system includes two aerial elements corresponding respectively to said two lobes and said receiving and amplifying means include a single receiver and amplifier and rotary switch means for intermittently inserting said receiver and amplifier now between one of said aerial elements and one of the outputs of said receiving and amplifying means and now between the other aerial element and the other of the outputs of said receiving and amplifying means.

3. An apparatus for determining the direction from which electromagnetic signals are received which comprises, in combination, a rotatable aerial system the directional pattern of which includes two lobes oblique to each other, means coupled with said aerial system for separately receiving and amplifying the signals arriving to said aerial system in said two lobes thereof respectively, said means having two distinct outputs for said respective signals, motor means for rotating said aerial system, a comparator device having two distinct input terminals and its output connected with said motor means for control thereof, and means for connecting said comparator device input terminals with the distinct outputs of said receiving and amplifying means respectively, said comparator device including, between each of said input terminals thereof and a common point connected to both of said input terminals, a rectifier, both of said rectifiers being mounted to correspond to current flow in the same direction, a resistance between each rectifier and the common point, two condensers, each interposed between the earth and a point of the connection between one rectifier and the corresponding resistance, the output of said comparator being connected between the earth and said common point.

4. An apparatus according to claim 3 including control means interposed between said common point and the earth and connected with said motor means for causing said motor means to rotate in one direction or the other according as the potential difference between said common point and the earth is in one direction or the other.

5. An apparatus according to claim 3 including a rotary switch interposed between said common point and the earth for intermittently connecting said common point with the earth, two circuits leading from said common point to the earth, each of said circuits including a rectifier and a primary winding and the two last mentioned rectifiers being arranged to permit current flow in opposite directions through said two circuits with respect to said common point, two amplifiers having their inputs connected with the secondaries of two transformers the primaries of which are constituted by said primary windings, respectively, the motor means for rotating the aerial system being constituted by a motor having two inductor windings acting in opposed directions and respectively connected with the outputs of said amplifiers, respectively.

HENRI GEORGES DE FRANCE.

REFERENCES CITED

The following references are of record in the file of this patent:

UNITED STATES PATENTS

| Number | Name | Date |
|---|---|---|
| 2,063,534 | Wallace | Dec. 8, 1936 |
| 2,138,966 | Hafner | Dec. 6, 1938 |
| 2,153,782 | Weber | Apr. 11, 1939 |
| 2,166,991 | Guanella | July 25, 1939 |
| 2,257,757 | Moseley | Oct. 7, 1941 |
| 2,262,931 | Guanella | Nov. 18, 1941 |
| 2,356,922 | Eltgroth | Aug. 29, 1944 |